United States Patent [19]

Nakayama

[11] Patent Number: 5,235,535
[45] Date of Patent: Aug. 10, 1993

[54] ARITHMETIC OPERATION APPARATUS FOR ELEMENTARY FUNCTION

[75] Inventor: Takashi Nakayama, Tokyo, Japan
[73] Assignee: NEC Corporation, Japan
[21] Appl. No.: 638,779
[22] Filed: Jan. 8, 1991
[30] Foreign Application Priority Data
  Jan. 8, 1990 [JP] Japan .................................. 2-1854
[51] Int. Cl.$^5$ .......................... G06F 7/38; G06F 15/32
[52] U.S. Cl. ..................................... 364/729; 364/735
[58] Field of Search ............... 364/729, 732, 735, 752, 364/753, 748.5, 736

[56] References Cited
U.S. PATENT DOCUMENTS

| | | | |
|---|---|---|---|
| 4,077,063 | 2/1978 | Lind | 364/729 |
| 4,809,205 | 2/1989 | Freeman | 364/729 |
| 5,042,001 | 8/1991 | Brightman et al. | 364/736 |

OTHER PUBLICATIONS

Elektronik, vol. 32, No. 9, May 1983, Munchen de, pp. 59–62; W. Taetow; "Digitale Multiplizierer in CMOS-- Technik".
Proceedings of the 7th Symposium on Computer Arithmetic, 4–6, Jun. 1985, Urbana, Ill. Jun. 1985, IEEE, New York, pp. 82–85; M. Ohnashi et al.: "High-Speed Computation of Unary Functions".
IBM Technical Disclosure Bulletin, vol. 31, No. 2, Jul. 1988, New York, pp. 331–334; "High Speed Floating Point Multi-Function Generator".

Primary Examiner—Long T. Nguyen
Attorney, Agent, or Firm—Laff, Whitesel, Conte & Saret

[57] ABSTRACT

An arithmetic operation apparatus performs an arithmetic operation of a differentiable elementary function including a sine function sin (x), a cosine function cos (x), arc tangent function arctan (x), an exponential function $e^x$, a logarithm function $\log_e(x)$, an inverted number $1/x$, a square root $\sqrt{x}$, and an inverted number of a square root $1/\sqrt{x}$. The apparatus comprises a divider receiving an initial value (x) for dividing the initial value into a more significant digit portion H and a less significant digit portion L ($x=H+L$), and $2^H$-word memories of "k" banks receiving the more significant digit portion H of the initial value (x) and storing a value obtained by multiplying the more significant digit portion H by a previously calculated constant $b_0 = f(H)$ or $b_k = (1/k!) \times f^{(k)}(H)$ (where k is positive integer). An arithmetic circuit composed of a multiplier and an adder receives the less significant digit portion L of the initial value (x) and an output of the memories for executing the following polynomial:

$$f(x) = b_0 + L \times \{b_1 + L \times \ldots (b_{k-1} + b_k \times L) \ldots \}.$$

4 Claims, 2 Drawing Sheets

ARITHMETIC OPERATION APPARATUS FOR ELEMENTARY FUNCTION

BACKGROUND OF THE INVENTION

1. Field of the invention

The present invention relates to an arithmetic operation apparatus for elementary functions in computers.

2. Description of related art

Computers for handling numerical data has to have numerical functions, particularly elementary functions including a sine function sin (x), a cosine function cos (x), arc tangent function arctan (x), an exponential function $e^x$, a logarithm function $\log_e(x)$, an inverted number $1/x$, and a square root $\sqrt{x}$. As a manner for calculating these elementary functions, the following algorithms have been known:

(1) approximate value method

This method utilizes a polynominal approximation such as Chebyshev expansion, Taylor expansion, and others, and a rational formula approximation such a continued-fraction expansion, which have been ordinarily used for obtaining an elementary function. However, which of the expansions should be selected dependently upon a function to be obtained. In addition, in the case of calculation of the elementary function of a floating point number in a doubled precision (precision of 52 digits in a binary number), multiplication and addition must be repeated more than ten times, and therefore, a long arithmetic operation time is required.

(2) CORDIC method

This is used for obtaining a trigonometric function and an inverted trigonometric function. This can unitarily calculates a plurality of elementary functions. However, for calculation of the elementary function in a doubled precision (precision of 52 digits in a binary number), addition/subtraction and shift must be executed $52 \times 3$ times, and therefore, a long arithmetic operation time is required.

(3) STL method

This is used for an exponential function and a logarithm function. However, for calculation of the elementary function in a doubled precision (precision of 52 digits in a binary number), addition/subtraction and shift must be executed $52 \times 2$ times, and therefore, a long arithmetic operation time is required.

(4) Newton method

This can be used only for a square root and a cube root, and a calculation equation should be selected dependently upon a function to be obtained. An initial value is given in the form of an approximate value, and addition/subtraction/multiplication/division is repeated until a required degree of precision is obtained. If the initial value has a relatively high precision, the repetition can be completed one or two times. For calculation of the elementary function in a doubled precision (precision of 52 digits in a binary number), the method can be realized with one time of reading of a table ROM (read only memory) and three to six times of addition/subtraction and multiplication. Therefore, a required arithmetic operation time is relatively short.

In any of the above mentioned conventional methods, it is rare that the same algorithm can be applied to a full range of argument. Therefore, it is an ordinary practice to convert the argument so that calculation is executed in a limited range.

For example, in the case of calculation of sin $\theta$, it is assumed that $\theta = p \times \pi/4 + x$ (where p is integer), and sin (x) and cos (x) are calculated in a range of $0 \leq x < \pi/4$. A procedure of limiting a range of argument as in this method is called an "argument reduction".

As seen from the above description, the above mentioned elementary function arithmetic operation methods are disadvantageous in the following points:

(1) The arithmetic operation time is long

Multiplication and addition must be repeated more than ten times in the approximate value method, and shift and addition/subtraction must be repeated more than ten times in the CORDIC method and the STL method. Therefore, the arithmetic operation time is very long.

(2) A plurality of elementary functions cannot unitarily handled

An optimum approximate value is different if the elementary function is different, and therefore, the approximate value method cannot unitarily process a plurality of elementary functions. On the other hand, the STL method and the Newton method are limited in elementary functions which can be treated. The CORDIC method can unitarily handle the trigonometric function and the inverted trigonometric function, but cannot treat the exponential function and the logarithm function.

SUMMARY OF THE INVENTION

Accordingly, it is an object of the present invention to provide an elementary function arithmetic operation which has overcome the above mentioned defect of the conventional one.

Another object of the present invention is to provide an elementary function arithmetic operation having a table for an elementary function f(x) and previously calculated numbers $f^{(k)}(x)/k!$ which are obtained by multiplying a k-order differentiation of f(H) with a predetermined constant, the elementary function arithmetic operation capable of quickly and precisely obtaining the elementary function arithmetic operation f(x) by a one-time searching of the table, "k" times of multiplication and "k" times of addition (where k is an integer in a range of 1 to 6 inclusive).

The above and other objects of the present invention are achieved in accordance with the present invention by an arithmetic operation apparatus for arithmetically operating a differentiable elementary function including at least one of a sine function sin (x), a cosine function cos (x), arc tangent function arctan (x), an exponential function $e^x$, a logarithm function $\log_e(x)$, an inverted number $1/x$, a square root $\sqrt{x}$, and an inverted number of a square root $1/\sqrt{x}$, comprising dividing means receiving an initial value (x) for dividing the initial value into a more significant digit portion H and a less significant digit portion L ($x = H + L$), $2^H$-word memories of "k" banks storing previously calculated constants $b_0 = f(H)$ or $b_k = (1/k!) \times f^{(k)}(H)$ (where k is positive integer) which are obtained by multiplying a k-order differentiation of f(H) by given constants, each of the memories receiving as an address the more significant digit portion H of the initial value (x) for outputting one of stored previously calculated constants designated by the address, and at least one arithmetic circuit composed of a multiplier and an adder and receiving the less significant digit portion L of the initial value (x) and an output of the memories for executing the following polynomial:

$$f(x) = b_0 + L \times \{b_1 + L \times \ldots (b_{k-1} + b_k \times L)\ldots\}$$

In one embodiment, assuming k=3, the elementary function f(x) can be obtained with precision of 4n digits by three times of multiplication and three times of addition. In another embodiment, assuming k=3, the elementary function f(x) can be obtained with precision of 2n digits by one time of multiplication and one time of addition.

Now, a principle of the elementary function arithmetic operation in accordance with the present invention will be described.

Assume that the elementary function f(x) is infinitely differentiable in a range of a given argument. The elementary function f(x) can be developed into a Taylor series. Assuming x=a, the Taylor development can be expressed as follows:

$$f(a + \delta) \approx f(a) + f^{(1)}(a) \times \delta/1! \\ + f^{(2)}(a) \times \delta/2! \\ + f^{(3)}(a) \times \delta/3! \\ \ldots \\ + f^{(k)}(a) \times \delta/k! \tag{1}$$

This Taylor development is disadvantageous in that if an absolute value of $\delta$ is large, an error becomes large, and the order number "k" of the approximation equation becomes large. On the other hand, if the absolute value of $\delta$ is made very small, the precision of the arithmetic operation can be elevated, and the order number "k" of the approximation equation can be reduced to an range of 1 to 5.

The elementary function arithmetic operation apparatus in accordance with the present invention is intended to make the range of $\delta$ as narrow as possible and to fall the order number "k" to a possible extent, by previously calculating values of f(a), $f^{(1)}(a)$, $f^{(2)}(a)$, ... $f^{(k)}(a)$ for as many initial numbers "a" as possible in the equation (1).

Here, consider the case in which an elementary function f(x) is sought in a binary number of 4n digits, from a given number "x" represented by a binary number of 4n digits (0≤x<1).

First, the given number "x" is divided into a more significant digit portion H and a less significant digit portion L by units of "n" digits. H and L correspond to "a" and "$\delta$" of the equation (1), respectively.

$$x = \sum_{k=1}^{4n} \{x_k + 2^{-k}\} = H + L \tag{2}$$

where $x_k = \{1, 0\}$ $$0 \leq x < 4 \tag{3}$$

$$H = \sum_{k=1}^{n} \{x_k \times 2^{-k}\} \tag{4}$$

$$L = \sum_{k=n+1}^{4n} \{x_k \times 2^{-k}\} \tag{5}$$

Here, putting a=H and $\delta$=L in the equation (1), since $L < 2^{-n}$ and $L^4 < 2^{-4n}$, the term of $L^4$ and subsequent terms can be neglected or ignored. Therefore, the equation (1) can be obtained with sufficient precision by limiting as k=3. Namely, $$f(x) = f(H) + f^{(1)}(H) \times L + (\tfrac{1}{2})f^{(2)}(H) \times L^2 + (1/6)f^{(3)}(H) \times L^3 \tag{6}$$

If this equation (6) is optimized in order to minimize the number of multiplication operations, the following equation (7) can be obtained:

$$f(x) = f(H) + L \times [f^{(1)}(H) + L \times \{(\tfrac{1}{2})f^{(2)}(H) + L \times (1/6)f^{(3)}(H)\}] \tag{7}$$

In this equation (7), if there is prepared a table ROM which receives H as an input and outputs the following:

$$b_0 = f(H)$$

$$b_k = f^{(k)}(H)/k! \tag{8}$$

(where k=1, 2, 3)
the following equation (9) can be obtained:

$$f(x) = b_0 + L \times \{b_1 + L \times (b_2 + L \times b_3)\} \tag{9}$$

Therefore, f(x) can be obtained with three multiplication operations and three addition operations.

Assuming that f(x) has no singular point within a designated range of "x", the value of $b_k$ will never become large. In addition, since $L < 2^{-n}$, $L^2 < 2^{-n}$, and $L^3 < 2^{-n}$, the constant table for the equation (9) is sufficient if it has 4n digits for $b_0$, 3n digits for $b_1$, 2n digits for $b_2$, and n digits for $b_3$.

Therefore, in order to obtain a value of the elementary function f(x) with precision of 4n digits, only a table ROM of $(4n+3n+2n+n)$ digits $\times 2^n$ words, multipliers and adders are required. Here, since the precision of multiplication of $b_3 \times L$ can be limited to "n" digits, some of the required multipliers and adders can have a reduced precision. In other words, all the required multipliers and adders are not required to have the same degree of precision of 4n digits.

In addition, some elementary function f(x) has an argument range of $1 \leq \times 2$. However, since an integer portion of "x" is fixed to "1", the table ROM is sufficient if it has $2^n$ words.

The above and other objects, features and advantages of the present invention will be apparent from the following description of preferred embodiments of the invention with reference to the accompanying drawings.

DESCRIPTION OF THE PREFERRED

ROM 6, coefficients to be held in the ROMs 7, 8 and 9, and the range of the argument "x".

TABLE 1

| Elementary Function $f(x)$ | 1st - Order Differentiation $f^{(1)}(x)$ | 2nd - Order Differentiation/2! $f^{(2)}(x)/2$ | 3rd - Order Differentiation/3! $f^{(3)}(x)/6$ | Range of Argument |
|---|---|---|---|---|
| $\sin(x)$ | $\cos(x)$ | $-\sin(x)/2$ | $-\cos(x)/6$ | $0 \leq x \leq \pi/4$ |
| $\cos(x)$ | $-\sin(x)$ | $-\cos(x)/2$ | $\sin(x)/6$ | $0 \leq x \leq \pi/4$ |
| $\arctan(x)$ | $\dfrac{1}{(x^2+1)}$ | $\dfrac{-x}{(x^2+1)^2}$ | $\dfrac{3x^2-1}{3(x^2-1)^3}$ | $0 \leq x \leq 1$ |
| $e^x$ | $e^x$ | $e^2/2$ | $e^x/6$ | $0 \leq x \leq \log_e 2$ |
| $\log_e(x)$ | $1/x$ | $1/2^x$ | $1/3x^3$ | $1 \leq x \leq 2$ |
| $1/x$ | $-1/x^2$ | $1/x^3$ | $-1/x^4$ | $1 \leq x \leq 2$ |
| $\sqrt{x}$ | $\dfrac{1}{2\sqrt{x}}$ | $\dfrac{-1}{8x\sqrt{x}}$ | $\dfrac{1}{16x^2\sqrt{x}}$ | $1 \leq x \leq 4$ |
| $1/\sqrt{x}$ | $\dfrac{-1}{2x\sqrt{x}}$ | $\dfrac{3}{8x^2\sqrt{x}}$ | $\dfrac{-5}{16x^3\sqrt{x}}$ | $1 \leq x \leq 4$ |

EMBODIMENTS

Figure 1:
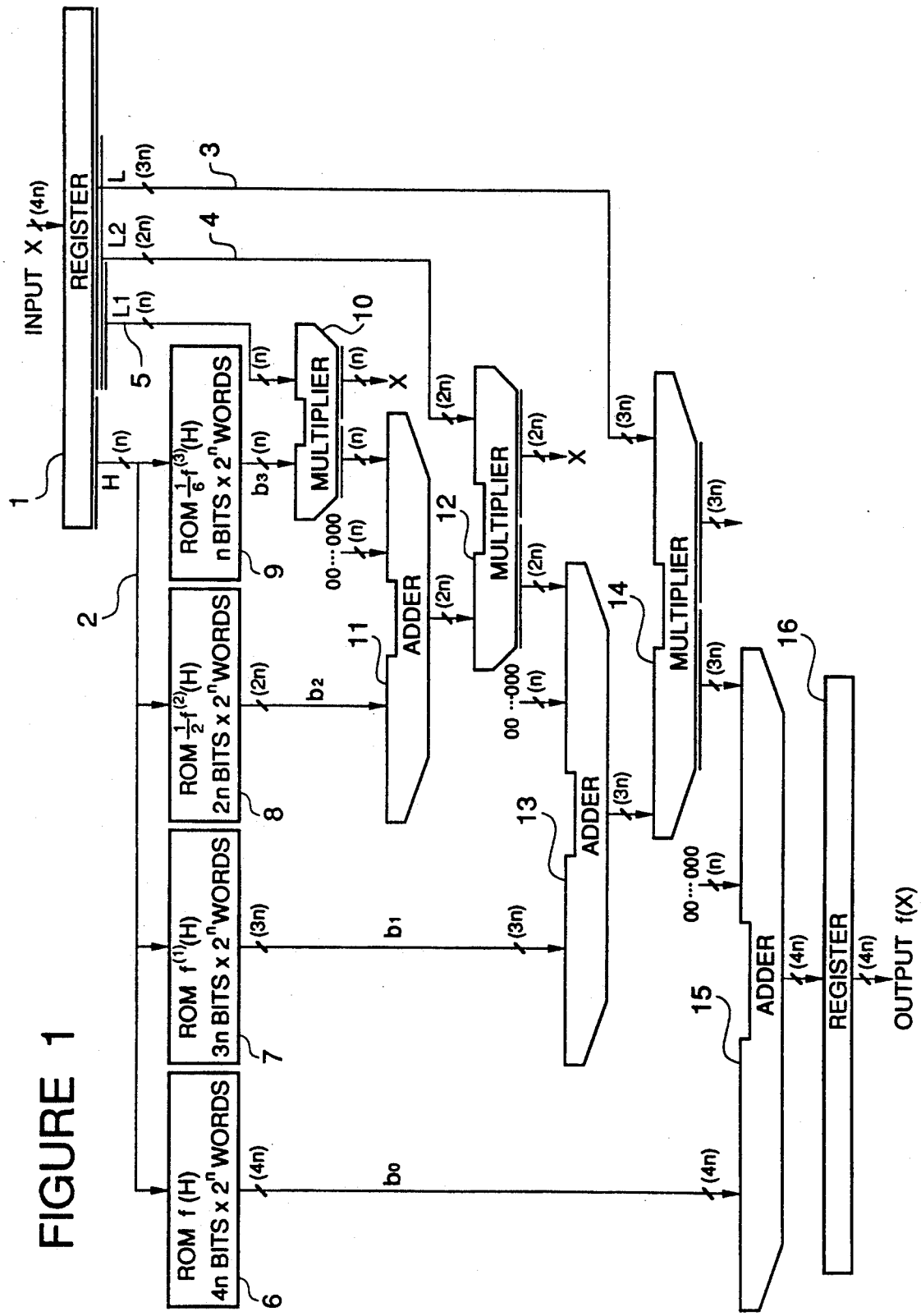
FIG. 1 is a block diagram of an embodiment of the elementary function arithmetic operation apparatus in accordance with the present invention.

Referring to FIG. 1, there is shown a block diagram of an embodiment of the elementary function arithmetic operation apparatus in accordance with the present invention. The shown apparatus includes a register 1 for receiving and holding an input variable "x". This register 1 has a capacity of 4n bits or more. More significant "n" bits of a decimal fraction portion of the variable "x" held in the register 1 are read out as a H signal 2, and least significant "3n" bits of the variable "x" held in the register 1 are read out as a L signal 3. More significant "2n" bits of the least significant "3n" bits are outputted as a L2 signal 4, and more significant "n" bits of the least significant "3n" bits are outputted as a L1 signal 5.

In addition, the shown apparatus includes a ROM (read only memory) 6 of 4n bits×$2^n$ words for holding values of f(H), a ROM 7 of 3n bits×$2^n$ words for holding values of $f^{(1)}(H)$, a ROM 8 of 2n bits×$2^n$ words for holding values of $f^{(2)}(H)/2$, and a ROM 9 of n bits×$2^n$ words for holding values of $f^{(3)}(H)/6$. Furthermore, the shown apparatus includes a multiplier 10 of "n" bits×"n" bits receiving the L3 signal 5 and an output of the ROM 9 for the purpose of calculating a product of the L3 signal 5 and the output of the ROM 9, and an adder 11 of 2n bits for adding an output of the ROM 8 with a data which is obtained by rightward shifting an output of the multiplier 10 by "n" bits. An output of the adder 11 and the L2 signal 4 are supplied to another multiplier 12 of "2n" bits×"2n" bits, which in turn outputs a product of the output of the adder 11 and the L2 signal 4. An output of the multiplier 12 is rightward shifted by "n" bits, and inputted to one input of another adder 13 of 3n bits, which has the other input connected to receive an output of the ROM 7. An output of the adder 13 and the L signal 3 are supplied to a third multiplier 14 of "3n" bits×"3n" bits, which in turn outputs a product of the output of the adder 13 and the L signal 3. An output of the multiplier 13 is rightward shifted by "n" bits, and inputted to one input of a third adder 15 of 4n bits, which has the other input connected to receive an output of the ROM 6, so that the n-bit rightward-shifted output of the multiplier 13 and the output of the ROM 6 are added. An output of the adder 16 is connected to an output register 16 of 4n bits.

The following table shows various elementary functions f(x) which can calculated by the apparatus shown in FIG. 1 and which therefore are to be held in the For example, if the elementary function f(x) to be obtained is sin(x), it could be understood from the table 1 that sin(H) is stored in the ROM 6, cos(H) is stored in the ROM 7 and −sin(H)/2 and −cos(H)/6 are stored in the ROMs 8 and 9, respectively.

In the apparatus shown in FIG. 1, if the argument "x" is inputted and registered in the input register 1, the H signal 2, which is composed of the more significant "n" bits of the decimal fraction portion of the argument "x" held in the register 1, is supplied to the ROMs 6 to 9 as an address. On the other hand, the multiplier 10 executes multiplication of the L3 signal 3 and a value of $f^{(3)}(H)/6$ read out of the ROM 9. A value of $L \times f^{(3)}(H)/6$ outputted from the multiplier 10 is rightward shifted by "n" bits for decimal point matching, and is added with a value of $f^{(2)}(H)/2$ read from the ROM 8, by means of the adder 11. The multiplier 12 multiplies an output value of the adder 11 by the L2 signal 4. An output of the multiplier 12 is rightward shifted by "n" bits for decimal point matching, and is added with a value of $f^{(1)}(H)$ read from the ROM 7, by means of the adder 13. The multiplier 14 multiplies an output value of the adder 13 by the L signal 3. An output of the multiplier 14 is rightward shifted by "n" bits for decimal point matching, and is added with a value of f(H) read from the ROM 6, by means of the adder 15.

As seen from the above, the arithmetic operation of the elementary function f(x) requires only a total times of an access time for the table ROMs and a time required for the three multiplication operations and the three addition operations.

In the case of obtaining a value of a given elementary function f(x) with precision of 52 bits (n=13), ROM 6 has a memory capacity of 52 bits×8192 words;

ROM 7 has a memory capacity of 39 bits×8192 words;

ROM 8 has a memory capacity of 26 bits×8192 words;

ROM 9 has a memory capacity of 13 bits×8192 words;

Multiplier 10 is a multiplier of 13 bits×13 bits;

Multiplier 12 is a multiplier of 26 bits×26 bits;

Multiplier 14 is a multiplier of 39 bits×39 bits;

Adder 11 is an adder of 26 bits;

Adder 13 is an adder of 39 bits; and

Adder 15 is an adder of 52 bits.

In the above case, a total memory capacity of the ROMs is 1,064,960 bits, which can be realized in the form of an LSI according to a recent semiconductor technique.

Furthermore, if each of the multipliers 10, 12 and 14 is constituted of a carry save adder and a carry propagate adder, the amount of hardware and the time of arithmetic operation can be effectively reduced by constituting each of the multipliers 10, 12 and 14 and the adders 11, 13 and 15 by the carry save adder and by putting carry propagate adder after the adder 15.

Figure 2:
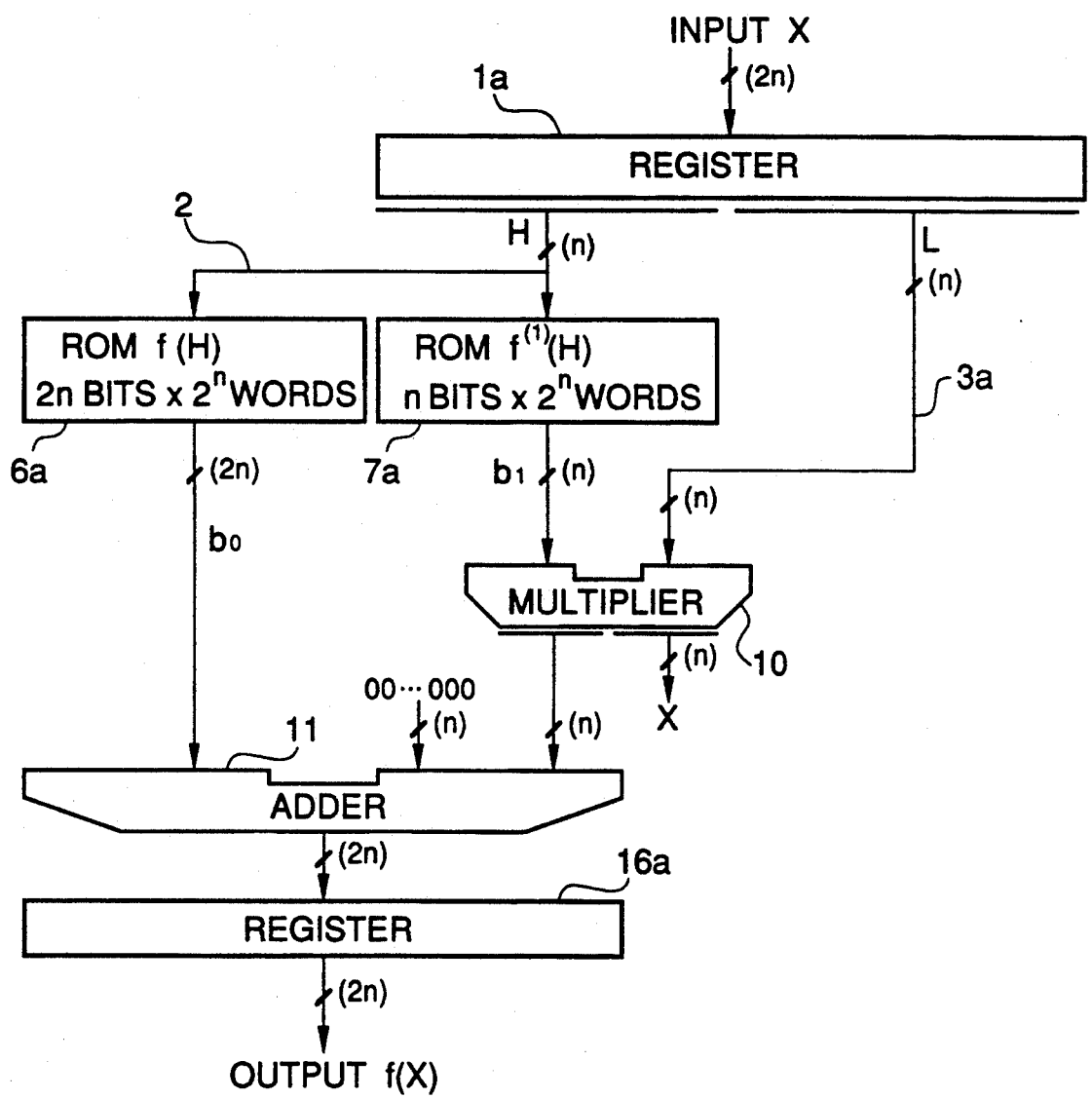
FIG. 2 is a block diagram of another embodiment of the elementary function arithmetic operation apparatus in accordance with the present invention.

Turning to FIG. 2, there is shown a block diagram of another embodiment of the elementary function arithmetic operation apparatus in accordance with the present invention. The first embodiment has a high degree of precision for the purpose of a doubled precision floating point data (such as 52 digits in a binary notation). However, the second embodiment is for a single precision floating point data (such as 24 digits in a binary notation). Specifically, the first embodiment has the precision of 4n digits under $k=3$ in the equation (3), and on the other hand, the second embodiment has the precision of 2n digits under $k=1$.

In the second embodiment, therefore, the equation (9) can be expressed as follows:

$$f(x) = b_0 + L \times b_1 \quad (10)$$

Therefore, f(x) can be obtained with one multiplication operation and one addition operation. In addition, since $H<1$ and $L<2^{-n}$, the constant table for the equation (10) is sufficient if it has 2n digits for $b_0$, and "n" digits for $b_1$.

The second embodiment includes a register 1a of 2n bits for receiving and holding an input variable "x". More significant "n" bits of a decimal fraction portion of the variable "x" held in the register 1a are read out as a H signal 2, and least significant "n" bits of the variable "x" held in the register 1 are read out as a L signal 3a. In addition, the shown apparatus includes a ROM 6a of 2n bits×$2^n$ words for holding values of f(H), and a ROM 7a of n bits×$2^n$ words for holding values of $f^{(1)}(H)$, which is a first-order differentiation of f(H). Furthermore, the shown apparatus includes a multiplier 10 of "n" bits×"n" bits receiving the L signal 3a and an output of the ROM 7a for the purpose of calculating a product of the L signal 3a and the output of the ROM 7a, and an adder 11 of 2n bits for adding an output of the ROM 6a with a data which is obtained by rightward shifting an output of the multiplier 10 by "n" bits. An output of the adder 6a is connected to an output register 16a of 2n bits.

If the argument "x" is inputted and registered in the input register 1a, the H signal 2, which is composed of the more significant "n" bits of the decimal fraction portion of the argument "x" held in the register 1a, is supplied to the ROMs 6a and 7a as an address. On the other hand, the multiplier 10 executes multiplication of the less significant "n" bits of the argument "x" (the L signal 3a) and a value of $f^{(1)}(H)$ read out of the ROM 7a. A value of $L \times f^{(1)}(H)$ outputted from the multiplier 10 is rightward shifted by "n" bits for decimal point matching, and is added with a value of f(H) read from the ROM 6a, by means of the adder 11. As the result, the adder 11 outputs $f(x) \approx f(H) + L \times f^{(1)}(H)$.

As seen from the above, the arithmetic operation of the elementary function f(x) requires only a total times of an access time for the table ROMs and a time required for the one multiplication operation and the one addition operation.

In the case of obtaining a value of a given elementary function f(x) with precision of 24 bits (n=12), the ROM 6a has a memory capacity of 24 bits×4096 words; the ROM 7a has a memory capacity of 12 bits×4096 words; the multiplier 10 is a multiplier of 12 bits×12 bits; and the adder 11 is an adder of 24 bits.

Therefore, a total memory capacity of the ROMs is 147,456 bits. Therefore, in order to realize the eight elementary functions shown in the table 1, a memory capacity of 1,179,648 bits is required, which can be realized in the form of an LSI.

As seen from the above, the elementary function arithmetic operation apparatus in accordance with the present invention is advantageous in the following two points:

(1) The arithmetic operation time is short

In the first embodiment of the elementary function arithmetic operation apparatus, the required processing time is a total time of the reading time of the table ROM, a triple of the multiplication time and a triple of the addition time. In the second embodiment, the required processing time is a total time of the reading time of the table ROM, the multiplication time and the addition time.

Now, assuming that the reading time of the table ROM is 0.20 μs, the multiplication time is 0.20 μs, and the addition time is 0.05 μs, the required processing time is 0.95 μs in the first embodiment and 0.45 μs in the second embodiment. (2) A plurality of elementary functions f(x) can be unitarily handled The elementary function arithmetic operation apparatus in accordance with the present invention can change over the elementary function f(x) by changing data stored in the table ROM. Therefore, if table ROMs corresponding to the eight kinds of elementary functions shown in the Table 1, one of the eight kinds of elementary functions, sin (x), cos (x), arctan (x), $e^x$, $\log_e(x)$, $1/x$, $\sqrt{x}$, and $1/\sqrt{x}$ can be selectively calculated.

The invention has thus been shown and described with reference to the specific embodiments. However, it should be noted that the present invention is in no way limited to the details of the illustrated structures but changes and modifications may be made within the scope of the appended claims.

I claim:

1. An arithmetic operation apparatus for arithmetically operating a differentiable elementary function, comprising: dividing means responsive to an initial value (*) for dividing said initial value into a more significant digit portion H and a less significant digit portion L(*=H+L), memory means comprising $2^n$ word memories coupled to said dividing means, each of said memories having "k" banks storing previously calculated constants $b_0 = f(H)$ and $b_k = (1/k!) \times f^{(k)}(H)$ which are obtained by multiplying a k-order differentiation of f(H) by given constants, address means for giving to each of said memories an address corresponding to said more significant digit portion H of said initial value (*), means responsive to said address for outputting a stored one of said previously calculated constants which are designated by said address, an arithmetic circuit means coupled to said dividing means and to said memories, said arithmetic circuit means comprising at least one multiplier and at least one adder and responsive to said less significant digit portion L of said initial value (*) and an output of said memories for executing the following polynomial:

$$f(*) = b_0 + L \times \{b_1 + L \times \ldots (b_{k-1} + b_k \times L) \ldots \}$$

said k being 3 and said arithmetic circuit means comprising three multipliers and three adders intercoupled so that a value of the elementary function can be obtained with precision of 4n digits.

2. An arithmetic operation apparatus claimed in claim 1 wherein said elementary function includes at least one of a sine function sin (x), a cosine function cos (x), arc tangent function arctan (x), an exponential function $e^x$, a logarithm function $\log_e(x)$, an inverted number 1/x, a square root $\sqrt{x}$, and an inverted number of a square root $1/\sqrt{x}$.

3. An arithmetic operation apparatus for arithmetically operating a differentiable elementary function, comprising: dividing means responsive to an initial value (*) for dividing said initial value into a more significant digit portion H and a less significant digit portion L (*=H+L), memory means comprising $2^n$ word memories coupled to said dividing means, each of said memories having "k" banks storing previously calculated constants $b_0 = f(H)$ and $b_k = (1/k!) \times f^{(k)}(H)$ which are obtained by multiplying a k-order differentiation of f(H) by given constants, address means for giving to each of said memories an address corresponding to said more significant digit portion H of said initial value (*), means responsive to said address for outputting a stored one of said previously calculated constants which are designated by said address, an arithmetic circuit means coupled to said dividing means and to said memories, said arithmetic circuit means comprising at least one multiplier and at least one adder and responsive to said less significant digit portion L of said initial value (*) and an output of said memories for executing the following polynomial:

$$f(*) = b_0 + L \times \{b_1 + L \times \ldots (b_{k-1} + b_k \times L) \ldots \}$$

said k being an integer which is greater than 1 and not greater than 3, and said arithmetic circuit means comprising three multipliers and three adders intercoupled so that a value of the elementary function can be obtained with precision of 4n digits.

4. An arithmetic operation apparatus for arithmetically operating a differentiable elementary function, comprising: dividing means responsive to an initial value (*) for dividing said initial value into a more significant digit portion H and a less significant digit portion L (*=H+L), memory means comprising $2^n$ word memories coupled to said dividing means, each of said memories having "k" banks storing previously calculated constants $b_0 = f(H)$ and $b_k = (1/k!) \times f^{(k)}(H)$ which are obtained by multiplying a k-order differentiation of f(H) by given constants, address means for giving to each of said memories an address corresponding to said more significant digit portion H of said initial value (*), means responsive to said address for outputting a stored one of said previously calculated constants which are designated by said address, an arithmetic circuit means coupled to said dividing means and to said memories, said arithmetic circuit means comprising at least one multiplier and at least one adder and responsive to said less significant digit portion L of said initial value (*) and an output of said memories for executing the following polynomial:

$$f(*) = b_0 + L \times \{b_1 + L \times \ldots (b_{k-1} + b_k \times L) \ldots \}$$

said k being a positive integer which is greater than 1, and said arithmetic circuit means comprising three multipliers and three adders intercoupled so that a value of the elementary function can be obtained with precision of 4n digits.

* * * * *